US008185560B2

(12) United States Patent
Arumainayagam et al.

(10) Patent No.: US 8,185,560 B2
(45) Date of Patent: May 22, 2012

(54) SYSTEMS, METHODS, SOFTWARE FOR INTEGRATION OF CASE LAW, LEGAL BRIEFS, AND LITIGATION DOCUMENTS INTO LAW FIRM WORKFLOW

(75) Inventors: Yohendran Arumainayagam, Lakeville, MN (US); Steven Brant Anderson, St. Paul, MN (US)

(73) Assignee: Thomson Reuters Global Resources, Baar (CH)

( * ) Notice: Subject to any disclaimer, the term of this patent is extended or adjusted under 35 U.S.C. 154(b) by 0 days.

(21) Appl. No.: 11/343,086

(22) Filed: Jan. 30, 2006

(65) Prior Publication Data
US 2006/0195430 A1    Aug. 31, 2006

Related U.S. Application Data

(60) Provisional application No. 60/648,048, filed on Jan. 28, 2005.

(51) Int. Cl.
*G06F 17/30* (2006.01)
(52) U.S. Cl. ........ 707/803; 707/769; 707/770; 707/791; 707/804
(58) Field of Classification Search .................. 707/769, 707/770, 792, 802, 803, 804
See application file for complete search history.

(56) References Cited

U.S. PATENT DOCUMENTS

| | | | | |
|---|---|---|---|---|
| 6,839,707 | B2 * | 1/2005 | Lee et al. .............................. | 1/1 |
| 7,127,405 | B1 * | 10/2006 | Frank et al. .................... | 705/310 |
| 7,209,921 | B2 * | 4/2007 | Pace et al. .............................. | 1/1 |
| 7,739,227 | B2 * | 6/2010 | Jordan et al. ................... | 707/600 |
| 2002/0138475 | A1 | 9/2002 | Lee | |
| 2003/0101181 | A1 * | 5/2003 | Al-Kofahi et al. ................ | 707/7 |
| 2003/0144969 | A1 * | 7/2003 | Coyne ........................... | 705/400 |
| 2004/0006594 | A1 * | 1/2004 | Boyer et al. ................... | 709/204 |
| 2004/0024775 | A1 * | 2/2004 | Kemp ............................ | 707/102 |
| 2005/0149343 | A1 * | 7/2005 | Rhoads et al. ..................... | 705/1 |
| 2005/0278633 | A1 * | 12/2005 | Kemp ............................ | 715/713 |
| 2006/0064434 | A1 * | 3/2006 | Gilbert et al. .............. | 707/104.1 |

FOREIGN PATENT DOCUMENTS
CA     2550154 A1     6/2005
(Continued)

OTHER PUBLICATIONS

"International Application Serial No. PCT/US2006/003038, International Search Report mailed May 26, 2006", 5 pgs.
(Continued)

*Primary Examiner* — Shahid Alam
*Assistant Examiner* — Andalib Lodhi
(74) *Attorney, Agent, or Firm* — Hoffman & Baron, LLP

(57) ABSTRACT

The present inventors recognized a need for improving conventional informational retrieval systems, particularly those intended for retrieval of legal information. Accordingly, they devised systems, methods, and software that facilitate online access to documents, such as non-opinion legal documents, in context of a legal workflow. An exemplary method of operation includes determining that a user of a client access device is performing a litigation-related task using a word-processing application on the client-access device. And in response to an affirmative determination, providing trial court materials relevant to the litigation-related task to the client access device without the user leaving the word-processing application. In some embodiments, the word-processing application is launched from a case-management application that provides case, activity, and role information to the online legal research system.

14 Claims, 4 Drawing Sheets

FOREIGN PATENT DOCUMENTS

Figure 1:
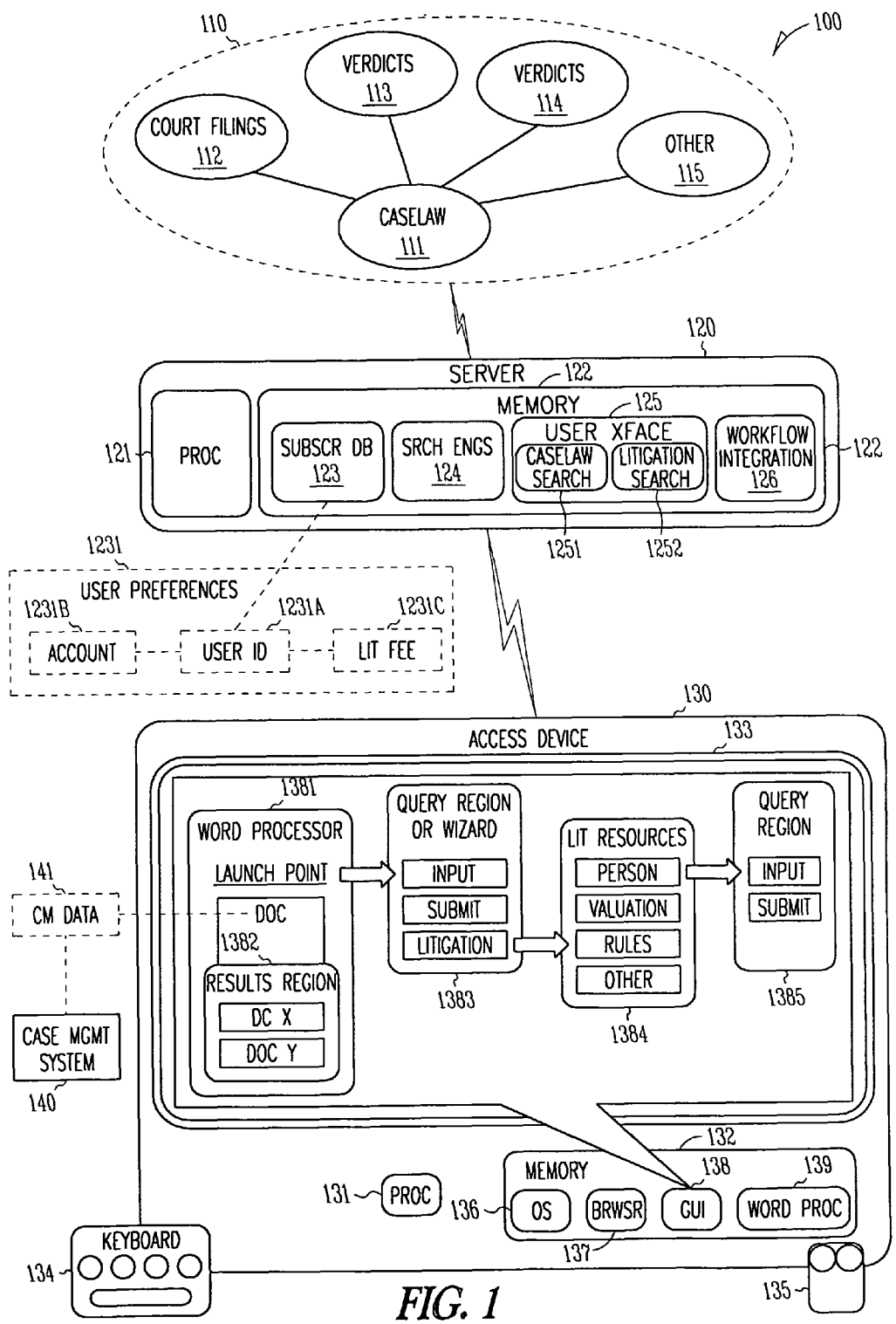

| | | |
|---|---|---|
| JP | 11-085795 | 3/1999 |
| JP | 2001-014327 | 6/1999 |
| JP | 2004-062364 | 2/2004 |
| JP | 2004-078910 | 3/2004 |
| JP | 2004-227385 | 8/2004 |
| WO | WO 03-060767 | 7/2003 |
| WO | WO-2006081472 A2 | 8/2006 |

OTHER PUBLICATIONS

"International Application Serial No. PCT/US2006/003038, Written Opinion mailed May 26, 2006", 4 pgs.

Australian Application No. 2006209231, Examination Report mailed Nov. 20, 2008, 2 pgs.

New Zealand Application No. 556742, Examiner Report mailed on Jun. 12, 2009, 2 pgs.

First Office Action for Chinese Patent Application No. 200680010371.1 dated Mar. 11, 2010.

Japanese Office Action (and English translation) issued on Oct. 19, 2011 for counterpart Japanese Patent Application No. 2007-553287.

Office Action issued on Nov. 14, 2011 in Canadian Patent Application No. 2,596,264.

\* cited by examiner

Westlaw     My Westlaw | Research Trail | Help c | Sign Off

Tabs: Patent | Westlaw | News & Business | Intellectual Property | Litigation | Federal Welcome | Find | KeyCite | Directory | Table of Contents | KeySearch | More ▽

Shortcuts [Edit] (410)

Andrews Litigation Reporters:
Current Awareness:
[Select a Reporter ▽] [GO]
Search:
Litigation Reporters
Court Documents

Quick Valuation:
Search for a valuation by type of injury:
[____] [GO]
[All Jurisdictions ▽]
[No Date Restriction ▽]

Recent Developments:
Litigation Updates
U.S. Supreme Court Briefs Updates

Finding Tools:
Find a Person
Find a Brief Title

Profiler – Expert:
Search by name or area of expertise:
[____] [GO]
[All States ▽]
Advanced Search
What is Profiler

Profiler – Attorney or Judge:
Search by name or practice area:
[____] [GO]
[All States ▽]
Advanced Search
What is Profiler

Find by Citation:
[____] [GO]
☐ and Print

KeyCite this Citation:
[____] [GO]

Search these Databases:
[____] [GO]
[Recent Databases ▽]
[Favorite Databases ▽]
View Westlaw Directory
View Litigation Directory

Local Rules Finder:
[Select a TOC ▽] [GO]

Related Westlaw Tabs:
Investigation
Medical Malpractice
Personal Injury
Products Liability

Resources [Edit] (420)

Cases & Statutes ⓘ
All Cases, Federal Cases, State Cases, Supreme Court Cases, Court of Appeals Cases, District Court Cases, USCA, CFR - Current Version, More...

Brief Bank ⓘ
Briefs Multibase, US Supreme Court Multibase, US Supreme Court: 1991-Current, US Supreme Court: 1976-1990, US Court of Appeals, US Supreme Court Petition for Certiorari, All States, CA Multibase, NY Court of Appeals, TX Supreme Court, FL Multibase, IL Supreme Court, PA Supreme Court, Fed Insurance Briefs, Fed Labor & Emp Briefs, More...

Litigation Documents & Transcripts ⓘ
Supreme Court Joint Appendices, Andrews Underlying Court Documents, Deposition Transcripts, Trial Motions, Trial Pleadings, US DCT Trial Filings by Juris, More...

Criminal Public Records ⓘ
Criminal Records All, Fed Crim Records, IL Crim Records, NY Crim Records, OFAC List, Sex Offenders More...

Jury Verdicts & Related ⓘ
National Evaluator Libaray, All Jury Verdicts, National Jury Verdicts, NY ALM VerdictSearch, CA ALM VerdictSearch, TX ALM VerdictSearch, Andrews Litigation Reports Combined, Stein-Digest of Awards, Trial Digest, ALR-Pers Inj Damages, Damages-Texts & Periodicals, More...

Investigation ⓘ
Person Tracker, Name Tracker, Address Search, Adverse Filings Combined, Asset Search Combined, DEA Licenses, Death Records, Professional Licenses

Jury Instructions ⓘ
Jury Instructions Combined, Jury Instructions Filings Combined, Model Jury Instructions Combined, Federal-Civil, Federal-Criminal, CA-Civil (BAJI), CA-Civil (CACI), CA-Criminal, FL-Civil, FL-Criminal, IL-Civil, IL-Criminal, NY-Civil, NY-Criminal, NY Carmody-Wait 2d, More...

Directories & Newspapers ⓘ
West Legal Directory, Profiler All, Profiler Expert Witness, Profiler Atty/Judges, US Newspapers, Journals & Law Revies, National Law Journal, NY Law Journal, NJ Law Journal, TX Lawyer, Lawyers Desk Reference 9TH Edition, WLD ADR Professionals, WLD Legal Investigators, More...

WestDockets ⓘ
Fed District Court, Fed Appellate Court, Bankruptcy Court, NY Supreme Court-Civil, US Court of Fed Claims, More...

Court Rules ⓘ
Fed Rules, Fed Orders, State Rules, States Orders, CA Rules, NY Rules, TX Rules, More...

Practice Guides ⓘ
ATLA's Lit Tort, Am Jur POF, Am Jur Trials, Causes of Action, Fed Prac & Proc, Fed Proc Lawyer's Ed, Fed Jury Prac & Instructions, Newberg Class Actions, Sutherland Statutory Construction, More...

Forms & Checklists ⓘ
All P&P, Am Jur P&P, West's Fed Forms, Federal Proc Forms, Pattern Dep Checklists, Expert Witness Checklists, Am Jur Legal Forms, Am Jur Legal Forms Tax Guide, More...

Legal Research Library ⓘ
ALR All, Am Jur, Am Jur Library-All, Journals & Law Reviews All, Major Secondary Publications, Restatements All, More...

Procedure & Evidence ⓘ
McCormick Evid, Handbook of Fed Evid, Fed Evid 2d, Fed Trial Handbook, Modern Scientific Evid, Trial Obj Handbook, Hearsay Handbook, More...

Online CLE Programs ⓘ
Litigation Practice Area CLE

*FIG. 4*

SYSTEMS, METHODS, SOFTWARE FOR INTEGRATION OF CASE LAW, LEGAL BRIEFS, AND LITIGATION DOCUMENTS INTO LAW FIRM WORKFLOW

CROSS-REFERENCE TO RELATED APPLICATIONS

This application claims priority to U.S. provisional application 60/648,048 which was filed on Jan. 28, 2005. Additionally, this application may be related to U.S. patent application Ser. No. 11/028,465 which was filed on Jan. 3, 2005. Both of these applications are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2005, Thomson Global Resources.

TECHNICAL FIELD

Various embodiments of the present invention concerns information-retrieval systems, such as those that provide legal documents or other related content.

BACKGROUND

The American legal system, as well as some other legal systems around the world, relies heavily on written judicial opinions, the written pronouncements of judges, to articulate or interpret the laws governing resolution of disputes. Each judicial opinion is not only important to resolving a particular legal dispute, but also to resolving similar disputes, or cases, in the future. Because of this, judges and lawyers within our legal system are continually researching an ever-expanding body of past opinions, or case law, for the ones most relevant to resolution of new disputes.

To facilitate these searches, companies, such as West Publishing Company of St. Paul, Minn. (doing business as Thomson West), collect and publish the judicial opinions of courts across the United States in both paper and electronic forms. Many of these opinions are published with bibliographic cites or hyperlinks to other opinions, that rely on or criticize various points of law in the opinions. The cites and hyperlinks enable researchers to readily access the related opinions electronically over a computer network, through the Westlaw™ online research system.

Recently, the Westlaw system has been expanded to include appellate briefs and litigation documents. The appellate briefs and litigation documents are linked to related judicial opinions. Thus, researchers using this system can not only identify relevant judicial opinions, but also retrieve and leverage content underlying these opinions.

Although this expansion of content represents an enhancement to the resources available to researchers, the present inventors have identified a functional gap between these resources and their usage in practice.

SUMMARY

To address this and/or other needs, the present inventors devised, among other things, systems, methods, and software that facilitate online access to documents, such as non-opinion legal documents, in context of a legal workflow. An exemplary method entails determining that a user of a client access device is performing a litigation-related task using a word-processing application on the client-access device. In response to an affirmative determination, the method further entails providing prior trial court materials, document templates, and/or document relevant to the litigation-related task to the client access device without the user leaving the word-processing application. In some embodiments, the word-processing application is launched from a case-management application that provides case, activity, and role information to the online legal research system. Additionally, some embodiments collect the provided trial court materials in a repository for access by other agents of a law firm that are associated with the case.

BRIEF DESCRIPTION OF DRAWINGS

FIG. 1 is a diagram of an exemplary information-retrieval system 100 corresponding to one or more embodiments of the invention;

FIG. 2 is a flowchart corresponding to one or more exemplary methods of operating system 100 and one or more embodiments of the invention;

FIG. 3 is a facsimile of an exemplary user interface 300 corresponding to one or more embodiments of the invention.

FIG. 4 is a facsimile of an exemplary user interface 400 corresponding to one or more embodiments of the invention.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

FIG. 1 shows an exemplary online information-retrieval system 100. System 100 includes one or more commercial databases 110, one or more servers 120, one or more access devices 130, one or client-side databases 140, and a case-management system 150.

Databases 110 include a set of one or more databases. In the exemplary embodiment, the set includes a caselaw database 111, a court filings database 112, a transcripts (XCRIPTS) database 113, a verdict and settlement database 114, and other databases 115. Caselaw database 111 generally includes electronic text and image copies of judicial opinions for decided cases for one or more local, state, federal, or international jurisdiction.

Court-filings database 112 includes electronic text and image copies of court filings related to one or more subsets of the judicial opinions caselaw database 111. Exemplary court-filing documents include briefs, motions, complaints, pleadings, discovery matter, and trial exhibits. Verdict and settlement database 114 includes electronic text and image copies of documents related to the determined verdict, assessed damages, or negotiated settlement of legal disputes associated with cases within caselaw database 111. Other databases 115 includes one or more other databases containing documents regarding news stories, business and finance, science and technology, medicine and bioinformatics, and intellectual property information. In some embodiments, the logical relationships across documents are determined manually or using automatic discovery processes that leverage information such as litigant identities, dates, jurisdictions, attorney identifies, court dockets, and so forth to determine the existence or likelihood of a relationship between any pair of documents.

Also, in some embodiments, databases 115 may include user- or firm-specific data repositories (semantic containers) that are only accessible by subscribers or subsets of subscribers from a specific law firm. In some instances, these repositories or more generally databases are organized around specific litigation matters of a law firm, providing convenience of central storage for all documents, including case law and related trial court documents for a litigation.

In some embodiments, databases 110 generally contain client intake content, such as jury verdicts, asset tracking records, criminal records, business news, lawyer profiles, and people data; practice insight content, such as jurisdictional proof-of-facts, case law, statutes, causes of action, and court rules; filings documents, such as court dockets, pleading and practice forms, and federal and local court forms; and drafting content, such as briefs, ALR, and jury instructions.

Databases 110, which take the exemplary form of one or more electronic, magnetic, or optical data-storage devices, include or are otherwise associated with respective indices (not shown). Each of the indices includes terms and/or phrases in association with corresponding document addresses, identifiers, and other information for facilitating the functionality described below. Databases 112, 114, and 116 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor 121, a memory 122, a subscriber database 123, one or more search engines 124, an interface module 125, and a workflow integration module 126.

Processor 121 is generally representative of one or more local or distributed processors or virtual machines. In the exemplary embodiment, processor 121 takes any convenient or desirable form. Processor 121 is coupled to memory 122.

Memory 122, which takes the exemplary form of one or more electronic, magnetic, or optical data-storage devices, stores subscription database 123, search engines 124, litigation module 125, and workflow integration module 126.

Subscription database 123 includes subscriber-related data for controlling, administering, and managing pay-as-you-go or subscription-based access of databases 110. Subscriber database 123 includes subscriber-related data for controlling, administering, and managing pay-as-you-go or subscription-based access of databases 110.

In the exemplary embodiment, subscriber database 123 includes one or more data structures, of which data structure 1231 is representative. Data structure 1231 includes a customer or user identifier portion 1231A, which is logically associated with data elements or fields, such as fields 1231B, and 1231C. Field 1231B includes information identifying one or more user accounts, such as a law firm or corporate account. Field 1231C includes one or more values governing whether litigation documents are charged on a transactional or per-access basis or whether access to these documents is included within a flat-rate or other type of subscription. In some embodiments, this field may also identify, indicate, or represent a specific pricing schedule to be used in assessing access fees for litigation (pre-decision) documents. In some embodiment, data structure 123 may also include information regarding a law-firm case-management system associated with the customer, which may be a law firm agent, such as an attorney, paralegal, expert, legal clerk, secretary, or scheduler.

Search engines 124 provide search capabilities for databases 110. In the exemplary embodiment, the search engines provide Boolean or natural-language search services; however, other embodiments may provide other types of searching.

User interface module 125 includes machine or device executable instructions for performing various tasks, such as defining one or portion of a graphical user interface that helps users define searches for databases 110. Software 125 includes one or more browser-compatible applets, webpage templates, user-interface elements, objects or control features or other programmatic objects or structures. More specifically, software 125 includes a caselaw search interface 1251 and a litigation search interface 1252, which are described more fully below.

Workflow integration module 126 includes machine or device executable instructions for performing various tasks, such as integrating search interfaces of user module 125 and/or content from databases 110 into workflows of law firm users. In the exemplary embodiment, these executable instructions includes add-on tools for providing interface features, such as launch points, wizards, and so forth that enable users to launch online searches or document retrievals from the context of client-side applications, such as word processing applications or case-management applications, without repeated entry of sign-on credentials. In some embodiments, workflow integration module 126 itself includes an online case-management system, document-management system, and/or word processing application. Other embodiments may also include instructions for storing documents retrieved or accessed by a particular law firm in a law-firm specific repository, which may be maintained within databases 115 or elsewhere within system 100. (Workflow integration module 126 may also include other instructions or functionally that is implied or specifically expressed herein.)

Server 120 is communicatively coupled or couplable via a wireless or wireline communications network, such as a local-, wide-, private-, or virtual-private network, to one or more accesses devices, such as access device 130.

Access device 130 is not only communicatively coupled or couplable to server 130, but also generally representative of one or more access devices. In the exemplary embodiment, access device 130 takes the form of a personal computer, workstation, personal digital assistant, mobile telephone, or any other device capable of providing an effective user interface with a server or database.

Specifically, access device 130 includes one or more processors (or processing circuits) 131, a memory 132, a display 133, a keyboard 134, and a graphical pointer or selector 135. Memory 132 stores code (machine-readable or executable instructions) for an operating system 136, a browser 137, a graphical user interface (GUI) 138, and a word processor application 139. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector (or mouse) 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

Graphical user interface 138 defines or provides one or more display control or application regions, such as a word processor window 1381, a query region 1382, a results region 1383, a litigation resources region 1384, and a specialized query region 1385. Each region (or page in some embodiments) is respectively defined in memory to display data from databases 110 and/or server 120 in combination with one or more interactive control features (elements or widgets). In the exemplary embodiment, some of these control features takes the form of a hyperlink or other browser-compatible command input. Although shown as being concurrently displayed in FIG. 1, various embodiments present one or more portion of interface 138 at different times and within different windows or screens.

More specifically, word processing region 1381 includes interactive control features, such as a legal-research launch point Launch Point, an edit window document DOC and a results region Results. (In some embodiments, the launch point is part of a toolbar of the word processor application.) Selection of launch point, which in the exemplary embodiment bears a Westlaw label, results in automatic performance of a search based specific text within document DOC, with the search operation performed using server 120. (Selection in some embodiments is achieved by a single- or double-click pointer action.) In some embodiments, the specific text may be a user selected name, a case citation, or a legal issue. In some embodiments, document DOC is associated with case management data 141 from case management system and the search is conducted based on one or more portions of data 141, which may identify one or more particular legal activities or document types. Results of the search are presented in context of the word processing application as results region 1382, which shows document selection links DOC X and DOC Y, which in the exemplary embodiment are court-filing documents, such as briefs, pleadings, exhibits, expert reports, trial exhibits, or transcripts, of prior adjudicated cases that are deemed similar based on data 141 to a case associated with the document or portion thereof. For example, if document DOC is associated with a document type summary judgment motion and the case management data or text in the document itself indicates the jurisdiction, the judge, and legal issues, the search results may include summary judgment motions from prior cases in the jurisdiction that dealt with similar legal issues before that judge. In some embodiments, the case-management data may include a schedule of events or docket dates which when correlated against the current date indicate or suggest the type of document DOC.

However, in some embodiments, selection of the launch point input presents the text and/or case management data to server 120, which causes presentation of query region (or query wizard) 1383 based on the received input. Region 1383 presents one or more input regions, such as INPUT region, and one or more submit command regions, such as SUBMIT region, and a litigation selection region LITIGATION for receiving user input. The form of the wizard and specific screens based on one or more portions of case management data 141, text in document DOC, and/or subsequent inputs to region 1383. For example, if document DOC is associated with a document type summary judgment motion, then the wizard may in some embodiments present questions regarding the nature of the legal issue or other matters that may not be addressed by the case management data. In the exemplary embodiment, legal research launch point Launch Point s presented as part of a tool bar in an graphical user interface portion of word processing application 139. Selection of control region LITIGATION results in presentation of litigation resources region 1384.

Litigation resources region 1384, which serves as a "one-stop shop" online interface, includes an aggregate set of control features which result in display of a version of query region 1385 that helps legal professionals evaluate, investigate, negotiate, prepare, and present trial-case information. In the exemplary embodiment, region 1384 includes command features, such as hyperlinks, for accessing search interfaces for professional profile data (PERSON), case-valuation data (VALUATION), court-rules data (RULES), and other data (OTHER). Profiler data allows users to initiate a search of available professional directories and/or other sources for biographical and experiential data based on attorney, judge, or expert witness name and/or jurisdiction directly from region 1384. Similarly, case-valuation data is data related to valuation of litigations based on jurisdiction and injury type directly from region 1384. Other embodiments provide these and/or other features. In some embodiments, the specific items listed under litigation resources are based on the case management data. For example, if the case management data indicates that the case is in appeal, the valuation link may be omitted or de-emphasized by placement at a lower position in a list or table. Also, in some embodiments, query region 1385 may be populated with inputs based on text in document DOC and/or portions of the case management data. In some embodiments, where the text in document DOC or the case management data are sufficient, query region 1385 includes a listing of one or more documents from databases 110. In the exemplary embodiment, one or documents selected by a user from any search results are added to a repository of data, which may for example function as a trial notebook. In some embodiments the repository is maintained as a private part of databases 110, and in others it is maintained as a part of case management system 140.

Case management system 140 may take a variety of forms. In the exemplary embodiment, system 140 takes the form of a case management system from ProLaw.

Exemplary Methods of Operation

Figure 2:
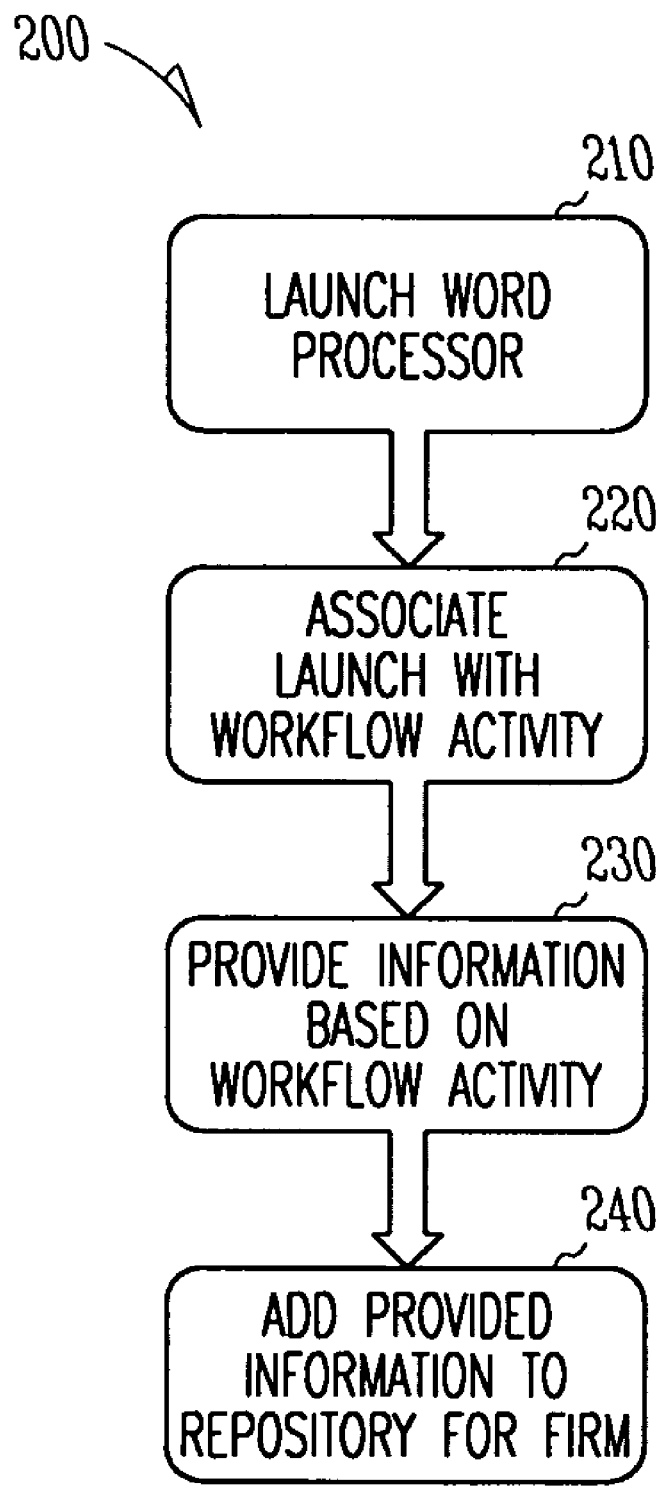

FIG. 2 shows a flow chart 200 of one or more exemplary methods of operating an information-management system, such as system 100. Flow chart 200 includes blocks 210-240, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

In block 210, the exemplary method begins with a user launching a word processing application. In the exemplary embodiment, this entails the user logging on to a firm intranet using specific login credentials and gaining access to a portion of a case management system related to a specific litigation matter. The user then invokes an activity icon within the litigation matter, such as draft a summary judgment motion, which via an application program interface, launches a word processing application, such as a Microsoft Word or Corel WordPerfect application. Successful launch results in opening an edit window having a launch point feature, such as shown in interface 138 in FIG. 1. Launching in this manner allows the case management system to preload an activity- or task-specific document template into the word processing application for use by the user. In some embodiments, the template is populated with specific text, such as party, court names, and case docket numbers that are associated with the matter number within the case management system. In other embodiments, one or more portions of the available case management data are associated with the template or new document as metadata. In other embodiments, the word processor is launched out of context of the case-management system, for example, within the context of a document management system, a browser, or an online research system that interfaces with the case management system. Execution then advances to block 220.

Block 220 entails determining that a user of a client access device is performing a litigation-related task. In the exemplary embodiment, this entails communicating information associated with the document within the editing window, for example one or more portion of the metadata and/or text within the document to a server, such as server 120. Server can then analyze this information and determine that a particular task is being performed relative to a workflow model. For example, this determination may entail detecting presence of an activity field or code inserted into the metadata for the document or presence of particular text within the title of the template or document.

Block 230 entails providing, in response to the determination, specific legal materials relevant to the litigation-related task without the user leaving the word-processing application. In the exemplary embodiment, this entails server 120 conducting a search of one or more of databases 110 for relevant trial-court materials based on metadata or text within the document and presenting results of the search, for example, a listing of pleadings, motions, or summary judgment motions on similar issues, to the user via interface 138. Execution continues at block 240.

Block 240 entails automatically collecting the provided trial court materials for reuse by one or more other agents of the law firm without additional searching. In the exemplary embodiment, this entails a user selecting one or more of the documents for addition to a firm-specific repository or database. However, in other embodiments, all documents presented to the user are automatically selected for storage in repository. Some embodiments place the selected documents in a database associated with a case management system, such as system 140.

Exemplary Litigation Resource Interfaces

Figure 3:
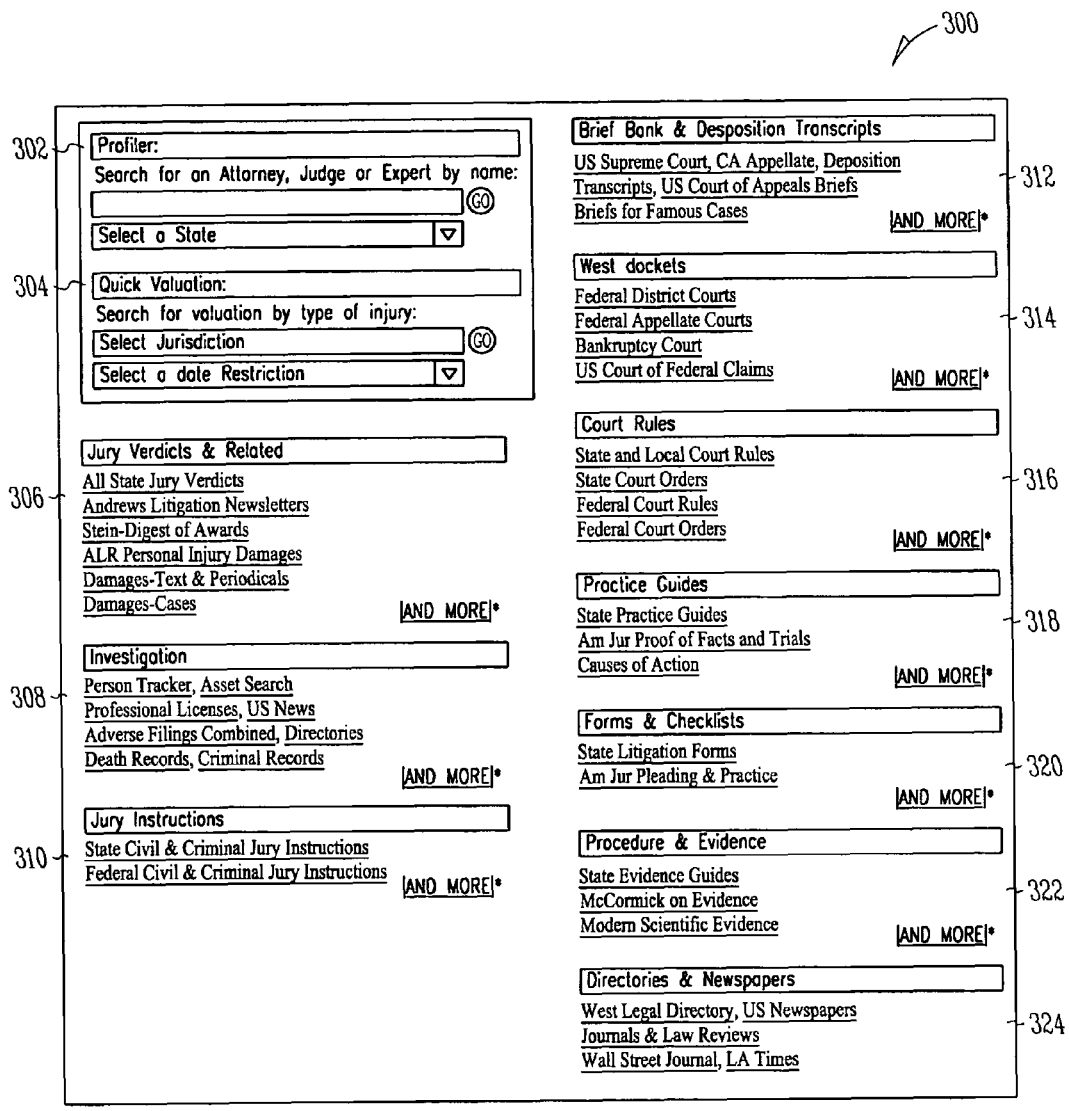

FIGS. 3 and 4 show respective litigation resource interfaces 300 and 400, which some embodiments use as an alternative to the litigation-resource region 1384 in FIG. 1. Interface 300 includes control features for accessing content and tools related to evaluation, investigation, negotiation, trial preparation, and trial presentation.

More specifically, interface 300 includes a profiler-query portion 302; a litigation-valuation-query region 304; a listing 306 of links to databases related to jury verdicts; a listing 308 of case-investigation databases; a listing 310 of links to jury-instruction database; a listing 312 of links to databases for briefs, depositions, or transcripts; a listing 314 of court-docket databases (or services); a listing 316 of links to court-rules databases; a listing 318 of links to databases of practice guides (or legal treatises); a listing 320 of databases containing forms and checklists; a listing 322 of databases related to procedures and evidence; and a listing 324 of professional directories and newspaper databases. Notably, selection of links within listings 306-322 invoke display of query input regions for their respective databases.

Similarly, interface 400, in FIG. 4, includes a shortcut portion 410 and a database (or resource) listing portion 420. Shortcut portion 410 includes several query input regions, and listing portion 420 includes several clusters of database listings.

Conclusion

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. An online legal research system, the system comprising:
   a case management system of a law firm configured to maintain an editable document related to a first legal case and identification information for the editable document, the identification information identifying the first legal case and an activity associated with the first legal case to which the editable document relates;
   a client access device configured to access the editable document from the case management system via a word processor application over a first network and to determine the identification information that identifies the first legal case and the activity to which the editable document relates, the client access device further configured to transmit at least a portion of the identification information including the activity over a second network; and
   a server coupled to one or more databases storing court documents of second legal cases, the server configured to communicate with the client access device over the second network to receive the portion of the identification information, the server further configured to conduct a search of at least one of the databases based on the received portion and to return to the client access device one or more court documents of at least one second legal case that are relevant to the activity of the first legal case.

2. The system of claim 1,
   wherein the identification information identifies a legal client of a law firm associated with the client access device, the first legal case associated with the legal client, one or more parties of the first legal case, one or more attorneys associated with the first legal case, one or more legal workflow activities associated with the first legal case including the activity; and
   wherein in response to identification of at least one of the legal workflow activities the client access device is configured to display one or more options to access content of the databases.

3. The system of claim 2, wherein the legal workflow activities include at least one of researching opposing counsel, researching a judge, researching opposing experts, finding a brief, anticipating a motion, responding to a brief, reviewing a brief, knowing when a client is sued, stating an argument, determining an attorney's work load, discovering a litigation strategy, valuing a case, finding an expert, evaluating an opposing counsel, writing a settlement letter, proposing a jury instruction, setting up an appeal, pulling a docket, filing a complaint, filing a motion, and scheduling a settlement conference.

4. The system of claim 2, wherein the content of the case management system includes medical records, civil verdict awards, and settlement agreements, criminal plea agreements and verdicts, arbitration awards, valuation aids, statistical reports if one of the legal work flow activities includes a case valuation activity.

5. The system of claim 1, wherein the editable document includes a template or a document type associated with the activity.

6. The system of claim 1, wherein the case management system includes at least one of a brief document, trial-court document, a local rules document, court docket, jury verdict, set of jury instructions, public records, and people information.

7. The system of claim 1, wherein the activity includes one of a case valuation activity, case negotiation activity, case preparation activity, trial activity, and post-trial activity.

8. The system of claim 1, wherein the returned court documents are presented as user-interface elements in a region of the word processor application while the editable document of the first legal case is being accessed via the word processor application.

9. The system of claim 8, wherein the client access device is further configured to access a returned court document from the server in response to selection of an associated user-interface element.

10. A method of performing legal research, the method comprising:

maintaining an editable document related to a first legal case and identification information for the editable document in a case management system of a law firm, the identification information identifying the first legal case and an activity associated with the first legal case to which the editable document relates;

accessing on a client access device the editable document from the case management system via a word processor application over a first network;

determining via the client access device the identification information that identifies the first legal case and the activity to which the editable document relates;

transmitting at least a portion of the identification information including the activity from the client access device to a server via a second network; and receiving by the client access device from the server via the second network one or more court documents of at least one second legal case that are relevant to the activity of the first legal case.

11. The method of claim 10, wherein accessing includes:
initiating the word processor application from the case management system; and
loading a template that includes the identification information into the editable document.

12. The method of claim 10, wherein the method further comprises automatically collecting the received court documents for reuse by one or more other agents of a law firm without additional searching.

13. The method of claim 10, wherein the method further comprises presenting the received court documents as user-interface elements in a region of the word processor application while the document of the first legal case is being accessed via the word processor application.

14. The method of claim 13, wherein the method further comprises accessing a received court document from the server in response to selection of an associated user-interface element.

* * * * *